United States Patent [19]
Paul

[11] Patent Number: 5,292,463
[45] Date of Patent: Mar. 8, 1994

[54] VARIABLE WIDTH FILM DIE

[75] Inventor: William C. Paul, Mt. Vernon, Ind.

[73] Assignee: General Electric Company, Pittsfield, Mass.

[21] Appl. No.: 939,790

[22] Filed: Sep. 3, 1992

[51] Int. Cl.$^5$ ............................................. B29C 47/86
[52] U.S. Cl. .................... 264/40.6; 264/40.7; 264/176.1; 264/327; 425/144; 425/379.1; 425/466
[58] Field of Search ............... 264/176.1, 40.6, 40.7, 264/327; 425/143, 144, 378.1, 465, 466, 461, 467, 379.1

[56] References Cited

U.S. PATENT DOCUMENTS

| | | |
|---|---|---|
| 3,293,689 | 12/1966 | Chiselko et al. . |
| 3,320,634 | 5/1967 | Ryan et al. . |
| 3,611,491 | 10/1971 | Rector ............................. 425/466 |
| 3,767,346 | 10/1973 | Mihalik ........................... 425/378.1 |
| 3,819,775 | 6/1974 | Mules ............................... 425/144 |
| 3,829,274 | 8/1974 | Melead . |
| 3,840,318 | 10/1974 | Solop ............................... 425/466 |
| 3,870,454 | 3/1975 | Penrod ............................. 425/466 |
| 3,940,221 | 2/1976 | Nissel .............................. 425/143 |
| 4,484,883 | 11/1984 | Honda et al. . |
| 4,488,861 | 12/1984 | Reifenhauser . |
| 4,761,197 | 8/1988 | Christine et al. ................ 156/290 |
| 4,793,788 | 12/1988 | Borger et al. . |
| 4,978,289 | 12/1990 | Maejima . |

FOREIGN PATENT DOCUMENTS 2060474  5/1991  United Kingdom .

*Primary Examiner*—Jeffery Thurlow

[57] ABSTRACT

A novel extrusion method and apparatus are disclosed for varying the width of an extruded article which employs the use of thermal pins in the extruder die body and does not involve the use of any mechanical manipulation of the die configuration.

17 Claims, 2 Drawing Sheets

VARIABLE WIDTH FILM DIE

The present invention relates to an apparatus for extruding thermoplastics. More particularly, the present invention relates to an apparatus and method for preparing thermoplastic sheets. Most particularly, the present invention relates to an apparatus and method for extruding thermoplastic resins to provide sheets of variable width.

BACKGROUND OF THE PRESENT INVENTION

The process of extruding thermoplastics to form a wide variety of articles is well known in the art. Extrusion has been employed to produce sheets, films, pellets and wire and cable coatings, as well as other products. Typically, the thermoplastic is fed to an extruder wherein the thermoplastic is melted and then the melt is forced through a shaping die under pressure.

One of the drawbacks associated with the extruding of sheets and other articles is the problem of the need to change the die when a different width article is desired. Removing the die and replacing it with a new die of different dimensions has proved to be cumbersome and cause a lot of down time on the extruder.

The use of adjustable deckles has been disclosed in the prior art to facilitate the altering of the width of the die and the extruded article. For example, Ryan et al., U.S. Pat. No. 3,320,634 disclose the use of adjustable deckle plates to change the die configuration. Chiselko et al., U.S. Pat. No. 3,293,689 teach the use of tracks to move deckle bars in order to regulate the width of extruded sheets. Another patent disclosing the use of adjustable deckles is Melead, U.S. Pat. No. 3,829,274.

Maejma, U.S. Pat. No. 4,978,289 discloses a process control system to adjust lip-width adjusting devices on the basis of a correction signal to provide uniformity in the width of the extruded article.

However all of these disclosures still require the use of mechanical devices to change the configuration of the die through which the molten thermoplastic flows. It would represent a notable advance in the state of the art if a means for altering the width of extruded articles could be provided which did not require mechanical manipulation of the die configuration.

To this end, the present applicant has found that the width of an extruded article can be altered without the need for mechanical modification of the extruder die. Such a notable advance enables the user to change the width of the extruder article while the extruder remains on line and does not result in any down time.

SUMMARY OF THE PRESENT INVENTION

According to the present invention there is provided a novel extrusion die apparatus comprising: an elongated die body; at least one inlet leading into said die body; an extruder die opening; and at least one means for removing heat from said die body. Preferred as heat removing means are thermal pins.

Also according to the present invention there is provided a method of varying the width of an extruded thermoplastic sheet comprising extruding a molten thermoplastic resin through an extruder equipped with an extrusion die body having a die opening adapted for extruding a sheet and having at least one means for removing heat from each end zone of the die body wherein the amount of heat removed from the end zone can be controllably varied.

DETAILED DESCRIPTION OF THE PRESENT INVENTION

The present invention provides a novel extruder apparatus which facilitates the varying of the width of an extruded article. The following description will be given in terms of sheet extrusion but can be equally applied to other extrusion methods.

Figure 1:
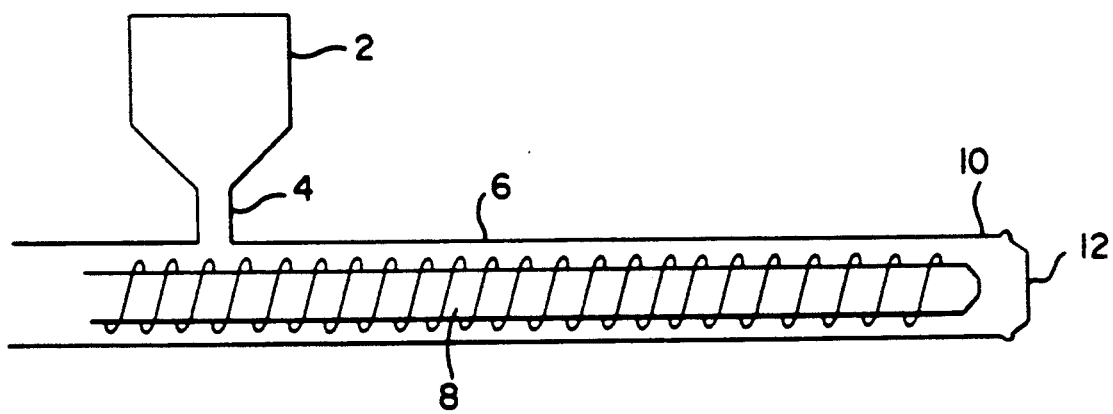
FIG. 1 is a diagram of a side view of an extruder useful in the practice of the present invention.

Referring to FIG. 1, a thermoplastic resin in a hopper 2 is fed through a feed throat 4 into the extruder barrel 6. A wide variety of thermoplastic resins are contemplated for use in the present invention. These include any thermoplastic resins which are typically employed in extrusion methods. Typically the thermoplastic resins useful in the practice of the present invention include, but are not limited to polyphenylene ether, alkenyl aromatic polymers and copolymers, polyamides, polycarbonates, polyether sulfones, polyesters, polyetherimides, polyetherimide esters, polyetheresters mixtures and copolymers of any of the foregoing. Such resins are well-known in the art, are described in the patent literature and are available commercially.

The resin is melted in barrel 6 by heater bands (not shown) and transported down the length of the barrel by screw 8. Any conventional screw or extruder may be employed in the process of the present invention. Thus, multiple screw extruders as well as single screw extruders may employed in the present invention. See, *Modern Plastics Encyclopedia* '89, McGraw Hill, pp. 242–44.

The molten thermoplastic then enters the die body 10 and exits the extruder through die 12 which can consist of any conventional die. See, *Modern Plastics Encyclopedia* '89, McGraw Hill, pp. 244–48. Preferably the die 12 is a die adapted for extruding a sheet.

Figure 2:
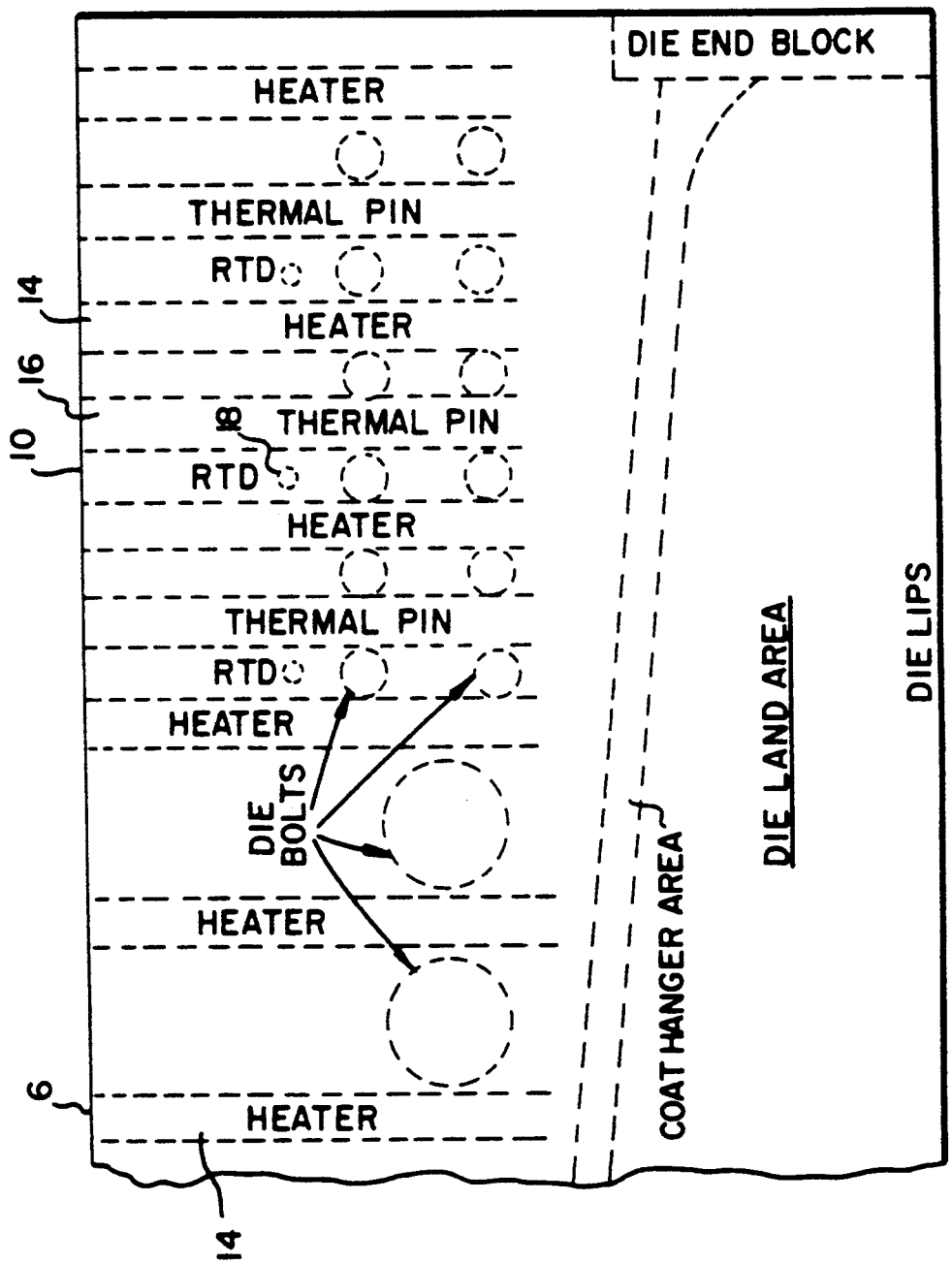
FIG. 2 is a diagram of a top view of an extruder die body useful in the practice of the present invention.

Referring now to FIG. 2, the barrel 6 equipped with heaters 14 lead into the die body 10. In the die body there are provided means for withdrawing heat from the die body interspersed between the heaters. Preferably, the means for withdrawing heat from the die body comprise thermal pins 16. Thermal pins are known in the art and are available commercially such as Noren thermal pin heat conductors.

Typically the thermal pin heat conductors are each individually connected to a chiller (not shown), such as a cool air supply, to supply a heat removing medium to the thermal pins.

By regulating the temperature of the die body, as monitored with thermocouples 18, one can alter the width of the thermoplastic which is extruded through the die. Individual controlling of each of the thermal pins allows more precise control of the die body temperature and therefore also more precise control of the sheet width.

DESCRIPTION OF THE PREFERRED EMBODIMENTS

The following example illustrates the present invention. It is not to be construed to limit the scope of the appended claims in any manner whatsoever.

EXAMPLE

A conventional die body is altered by removing die bolts to accommodate the inclusion of thermal pins. The desired number of thermal pin holes are drilled midway between the cartridge heater holes on each end of the die. These holes are found to interfere with the bolts used to hold the die halves together, so four smaller holes are drilled and tapped into the die to hold the die halves together. The original die has six heaters on the end zone of the die for heat control—three in the top half of the die and three in the bottom half of the die. These end zones are thereby converted to three heat zones comprising of two heaters each, i.e., each zone comprises of the bottom and top half heaters connected as a single heat zone. Thermocouple (RTD) holes are drilled between each thermal pin and heater zone to control the temperature in that area.

A housing was then fabricated to enclose the thermal pins. Connected to the housing was a portable chiller to supply chilled air to cool the thermal pins. Further the housing has a damper to regulate the flow of the chilled air. To vary the width of the film product, insert the required number of thermal pin heat conductors in each half of the die and disconnect the heaters in that area. Use the remaining heaters to control the die temperatures to produce the desired width of film.

Alternatively, the temperature of the die zones can be varied by altering the amount of chilled air flow through the thermal pins, or by varying the temperature of the air, or by varying the number of thermal pins employed.

A 4½ inch Sterling single screw extruder was operated with polycarbonate employing the following temperature conditions:

Zone 1-124° F.; Zone 2-448° F.; Zone 3-530° F.; Zone 4-530° F.; and Zone 5-535° F., Zone 1 being nearest the end block and Zone 5 being farthest from the end block.

Chilled air is circulated to the housing at 50° F., and removed from the housing at 91° F. The film width operating at these conditions was 29 inches.

The damper on the exit side of the housing on the thermal pin housing was partially closed to reduce the air flow and raise the zone 1 temperature to 131° F. This had little effect on the film appearance. This procedure was repeated until the damper was completely closed (Example 5) as follows to produce sheets of varying widths.

| | Example | | | | |
|---|---|---|---|---|---|
| | 1 | 2 | 3 | 4 | 5 |
| Temperature Profile, °F. | | | | | |
| Zone 1 | 124 | 131 | 145 | 190 | 240 |
| Zone 2 | 448 | 468 | 477 | 509 | 530 |
| Zone 3 | 530 | 530 | 539 | 541 | 541 |
| Zone 4 | 530 | 544 | 557 | 561 | 561 |
| Zone 5 | 535 | 520 | 515 | 508 | 508 |
| Sheet Width, inches | | | | | |
| | 29 | 29 | 31.75 | 32.25 | 33.5 |

It can be seen from the data above, that the apparatus and process of the present invention provides a means for varying the width of an extruding sheet without the need for mechanically manipulating the die configuration.

The above-mentioned patents and publications are hereby incorporated by reference.

Many variations of the present invention will suggest themselves to those of ordinary skill in the in light of the above-detailed description. All such obvious modifications are within the full intended scope of the appended claims.

I claim:

1. An extrusion die for extruding products comprising:
    an elongated die body;
    at least one inlet leading into said die body;
    means for heating said die body;
    an extruder die; and
    at least one means for removing heat from said die body wherein said die body comprises more than one zone, each said zone comprising at least one means for heating and at least one means for removing heat whereby, by adjusting the temperatures of the zones, the width of the extruded product may be adjusted without changing the die.

2. An extrusion die as defined in claim 1 wherein said wherein said extruder die comprises a sheet die.

3. An extrusion die as defined in claim 1 wherein said means for removing heat from said die body comprises at least one thermal pin.

4. An extrusion die as defined in claim 3 wherein said at least one thermal pin is connected to a housing through which a coolant is circulated.

5. An extrusion die as defined in claim 4 wherein said coolant comprises chilled air.

6. An extrusion die as defined in claim 1 wherein said die further comprises at least one thermocouple.

7. An extrusion die as defined in claim 1 wherein said die comprises three of said zones.

8. In an extrusion die for extruding a product comprising an elongated die body; at least one inlet leading into said die body; means for heating said die body; and an extruder die having fixed dimensions; the improvement comprising at least one means for removing heat from said die body whereby, by removing less or more heat from said die body, the width of the extruded product may be varied without changing the dimensions of the die.

9. A method for varying the width of an extruded article from an extruder said method comprising extruding a thermoplastic material through an extruder having a extrusion die having fixed dimensions an elongated die body; at least one inlet leading into said die body; means for heating said die body; an extruder die; and at least one means for removing heat from said die body; whereby the width of the extruded article is varied by adjusting the amount of heat supplied to the extrusion die without changing the dimensions of the die.

10. A method as defined in claim 9 wherein said thermoplastic material is selected from the group consisting of polyphenylene ether, alkenyl aromatic polymers and copolymers, polyamides, polycarbonates, polyether sulfones, polyesters, polyetherimides, polyetherimide esters, polyetheresters mixtures and copolymers of any of the foregoing.

11. A method as defined in claim 9 wherein said extruder die is a sheet die and said extruded article is an extruded sheet.

12. A method as defined in claim 11 wherein the means for removing heat from said die body comprises at least one thermal pin.

13. A method as defined in claim 12 wherein said at least one thermal pin is connected to a housing through which a coolant is circulated.

14. A method as defined in claim 13 wherein said coolant comprises chilled air.

15. A method as defined in claim 13 wherein the width of said extruded article is varied by varying the amount of chilled air circulated through said housing.

16. A method as defined in claim 14 wherein the width of said extruded article is varied by varying the temperature of said chilled air.

17. A emthod as defined in claim 12 wherein the width of the extruded article is varied by varying the number of thermal pins.

* * * * *